Dec. 29, 1936.  C. E. DELK  2,066,254
ARTIFICIAL FISHING LURE
Filed March 1, 1934
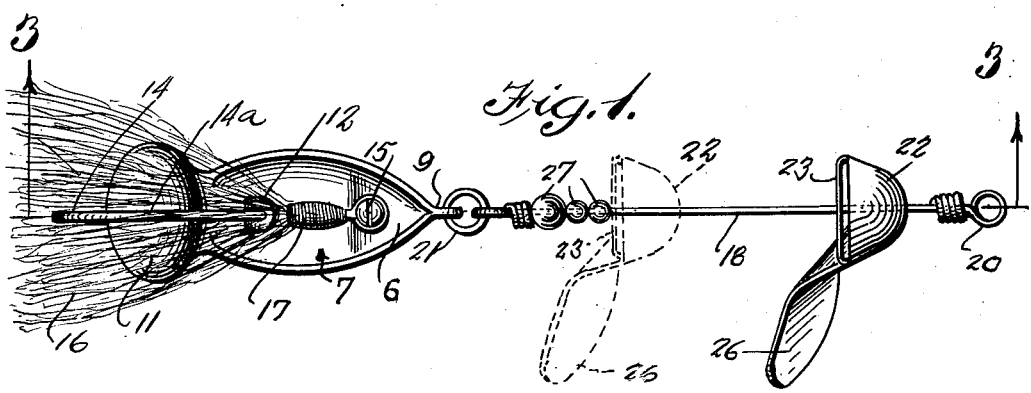
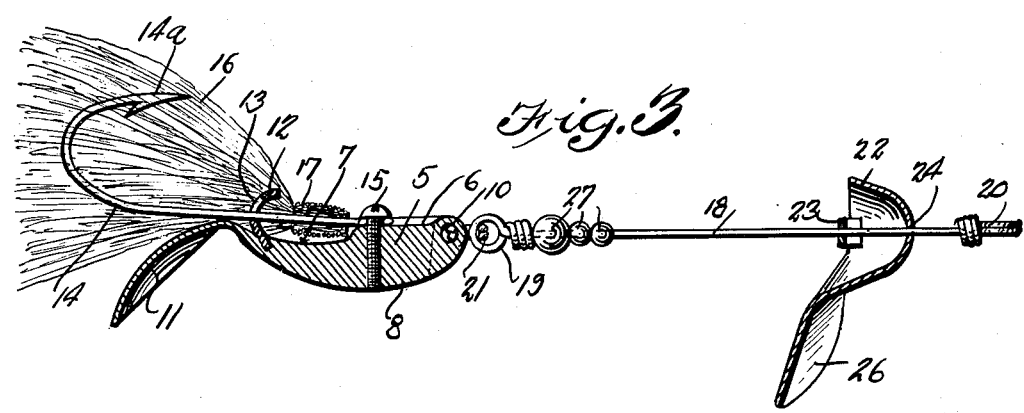
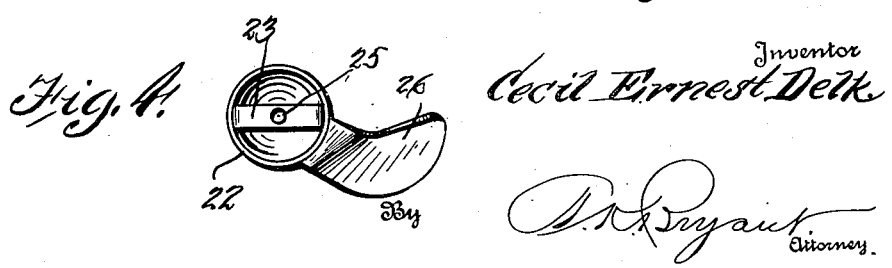
Inventor
Cecil Ernest Delk
By
D. N. Bryant
Attorney Patented Dec. 29, 1936

2,066,254

UNITED STATES PATENT OFFICE 2,066,254

ARTIFICIAL FISHING LURE

Cecil Ernest Delk, Amarillo, Tex.

Application March 1, 1934, Serial No. 713,592

1 Claim. (Cl. 43—42)

This invention relates to certain new and useful improvements in artificial fishing lures.

The primary object of the invention is to provide an artificial fishing lure, preferably constructed of metal and having a shining or luminous finish to attract fish thereto and is adapted for the art of casting or trolling.

A further object of the invention is to provide a fishing lure of the foregoing character and of the spinner type for travelling under water and constructed in a manner to prevent the pick-up of weeds or marine growth and one which has a swinging and rolling motion imparted thereto during its travel through the water.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of the complete artificial fishing lure showing the spinner by dotted lines in a shifted position on the spinner rod;

Figure 2 is a side elevational view of the device;

Figure 3 is a longitudinal sectional view taken on line 3—3 of Figure 1, showing the two-point bearing connection between the spinner and spinner rod, the fish hook anchored to the lure body and the rear end spoon extension on the latter; and Figure 4 is a rear end elevational view of the spinner.

Referring more in detail to the accompanying drawing, the artificial fishing lure comprises a lure having a body portion 5 that is of substantially ovate form as illustrated in Figure 1 and of substantially solid construction as shown in Figure 3 with the exception of a pair of upper surface depressions 6 and 7, the lower side of the body portion 5 being of convex formation as at 8. A rib 9 projects forwardly of the body portion 5 and is apertured as at 10 to accommodate the attachment of a spinner rod. A blade-like spoon 11 projects rearwardly and downwardly at the rear end of the body portion 5 and cooperates with the body portion to effect a swinging and rolling motion of the lure body during its travel through water.

A curved guide arm 12 projects upwardly and forwardly of the rear end of the upper surface depression 7 of the lure body and is slotted as at 13 for the passage of the shank of the fish hook 14, the hook barb 14a being directed upwardly of the body portion 5 while the other end of the shank of the fish hook 14 is provided with an eye that rests upon the rear end of the depression 6 to receive the anchor screw 15 for retaining the fish hook engaged with the lure body. The fish hook is guarded or concealed by the usual cluster of hair or feathers 16 anchored to the shank of the fish hook by the cord 17.

The spinner rod 18 is provided with eyes 19 and 20 respectively at opposite ends thereof, the eye 19 having a link connection 21 with the apertured rib 9 at the forward end of the body portion 5 of the lure, while a fishing line is adapted to be attached to the eye 20 at the forward end of the spinner rod 18.

A spinner is rotatably mounted upon the spinner rod 18 and embodies a hood or cup-shaped portion 22 having a transverse strip 23 extending across the rear open end thereof, the hood 22 having a central opening 24 alined with the center opening 25 in the transverse strip 23 to accommodate the rotatable mounting of the spinner on the spinner rod and providing a two-point bearing therefor to facilitate an easy and smooth rotation of the spinner on the spinner rod. An arm or blade 26 projects outwardly of the spinner from the rear open side thereof and at the marginal edge, preferably being a continuation of the body portion of the spinner and is suitably twisted or canted to function as a propeller blade when the lure is drawn through water to impart rotary motion to the spinner on the spinner rod. One or more beads or spherical bearing elements 27 are freely rotatable upon the spinner rod 18 between the eye 19 and spinner and constitute bearing abutments for the bearing strip 23 of the spinner for the purpose of reducing friction and to effect a substantially unobstructed spinning action.

From the above detailed description of the invention it is believed that the construction and use will at once be apparent, it being understood that the lure body and spinner may be manufactured by casting, molding, pressing or stamping operations. The body portion 5 of the lure is to be of sufficient weight to ride in the upright position shown in Figures 2 and 3 and during its travel through water, the concaved spoon 11 creates a swinging and rolling motion for the body and hook attached thereto, regardless of the speed of travel, the rotation of the spinner causing a rolling motion of water which passes under the convexed lower side 8 of the lure body and results in the swinging and rolling motion of the lure body, such action being in simulation of a small fish or minnow in retreat.

While there is herein shown and described the preferred embodiment of the invention, it is nevertheless to be understood that minor changes may be made therein without departing from the spirit and scope of the invention as claimed.

I claim:—

In an artificial fishing lure, a lure body having a spoon projecting from its rear end, the upper side of the forward portion of the body being flat and the rear portion thereof being dished, a fish hook carried by the upper side of the body and extending over the flat and dished portions, a rib at the forward end of the body, a spinner rod connected to the rib and a spinner on the spinner rod, an anchor screw engaged with the eye end of the hook for securing the same to the flat portion of the body, an arcuate guide arm having one end embedded in the body and rising from the rear end of the dished portion of the body in spaced relation to the forward flat portion and having a slot therein through which the hook extends for retaining the latter in position on the body and permitting limited movements of the hook toward and away from the body and a hair cluster secured to the shank of the fish hook within the dished portion of the body between the arcuate guide and hook anchor.

CECIL E. DELK.